April 6, 1937.  L. E. HUGHES  2,075,944
HYDRAULIC TRANSMISSION
Filed May 5, 1932  8 Sheets-Sheet 3
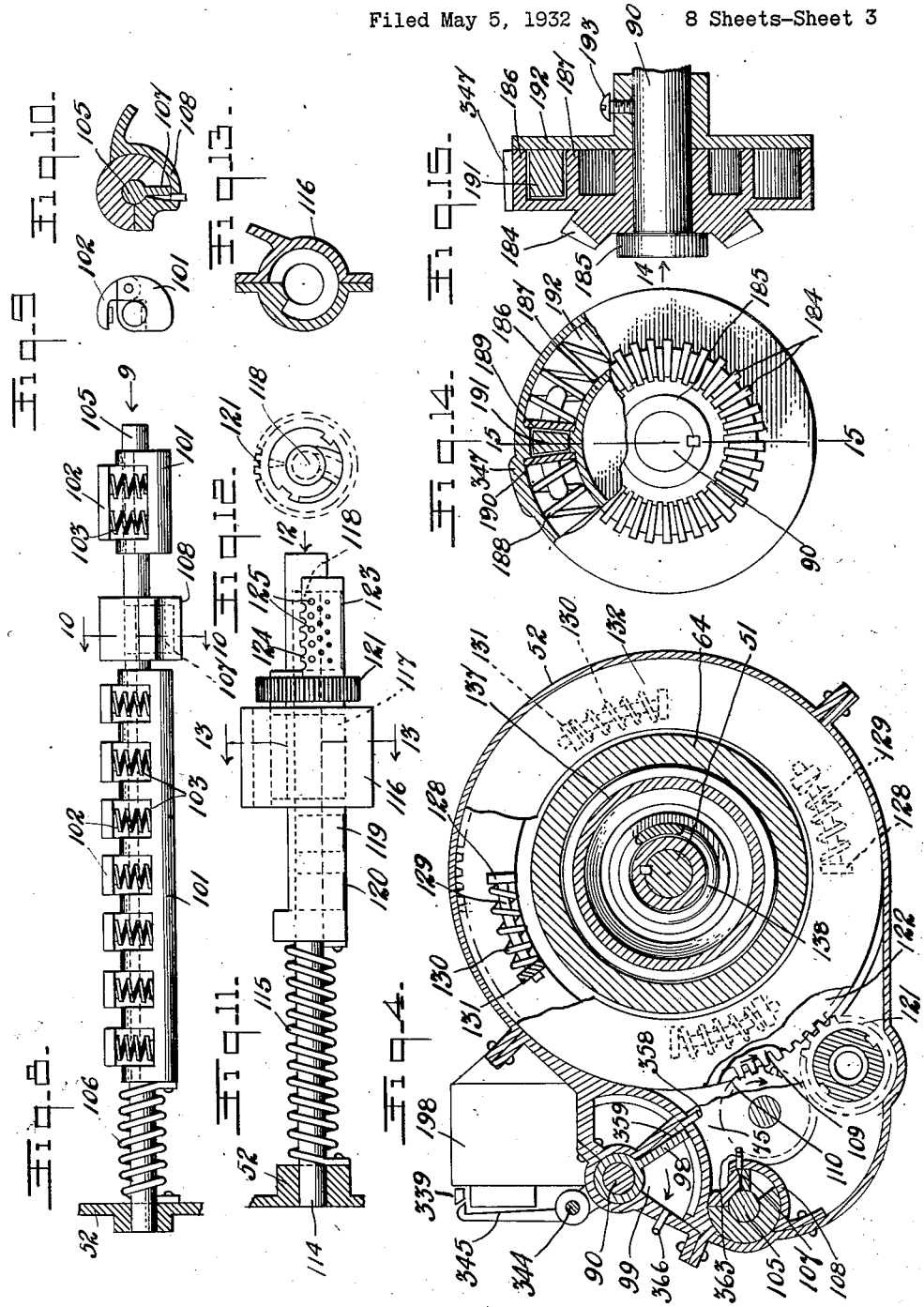
WITNESS:
INVENTOR
Leigh E. Hughes
BY
HIS ATTORNEY April 6, 1937.  L. E. HUGHES  2,075,944
HYDRAULIC TRANSMISSION
Filed May 5, 1932  8 Sheets-Sheet 4
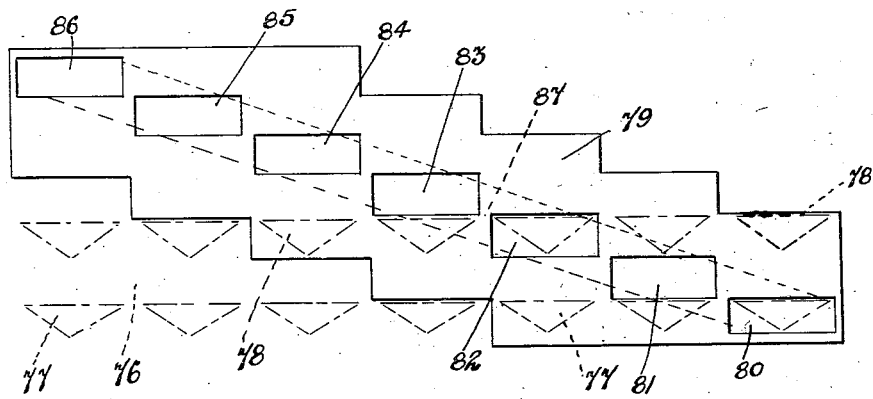
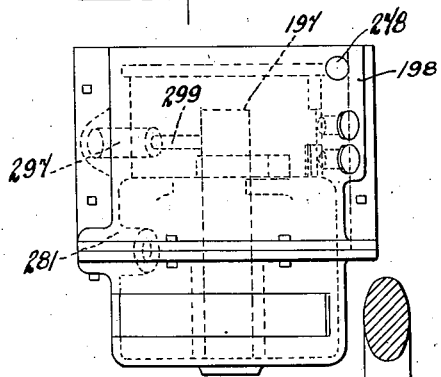
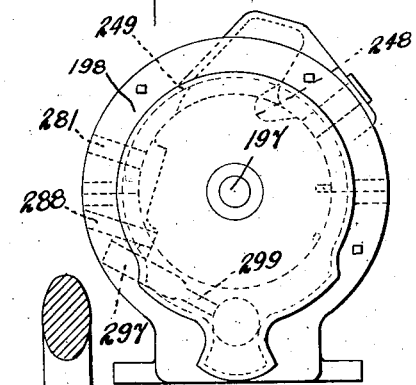
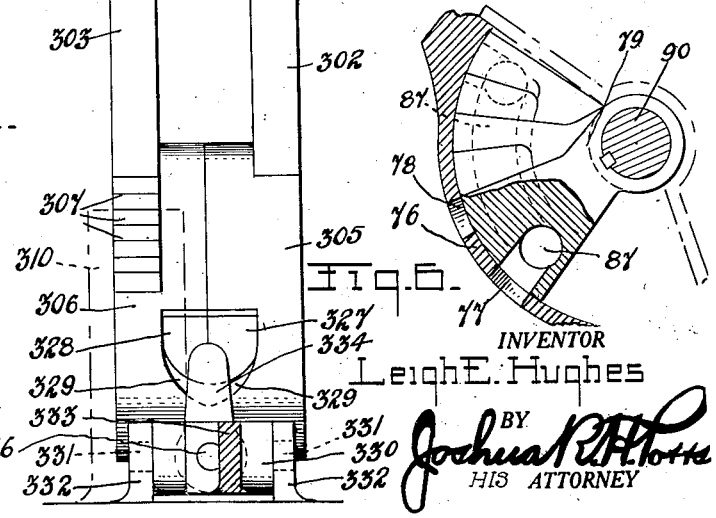
WITNESS:
INVENTOR
Leigh E. Hughes
BY Joshua R. H. Potts
HIS ATTORNEY April 6, 1937.  L. E. HUGHES  2,075,944
HYDRAULIC TRANSMISSION
Filed May 5, 1932  8 Sheets-Sheet 5
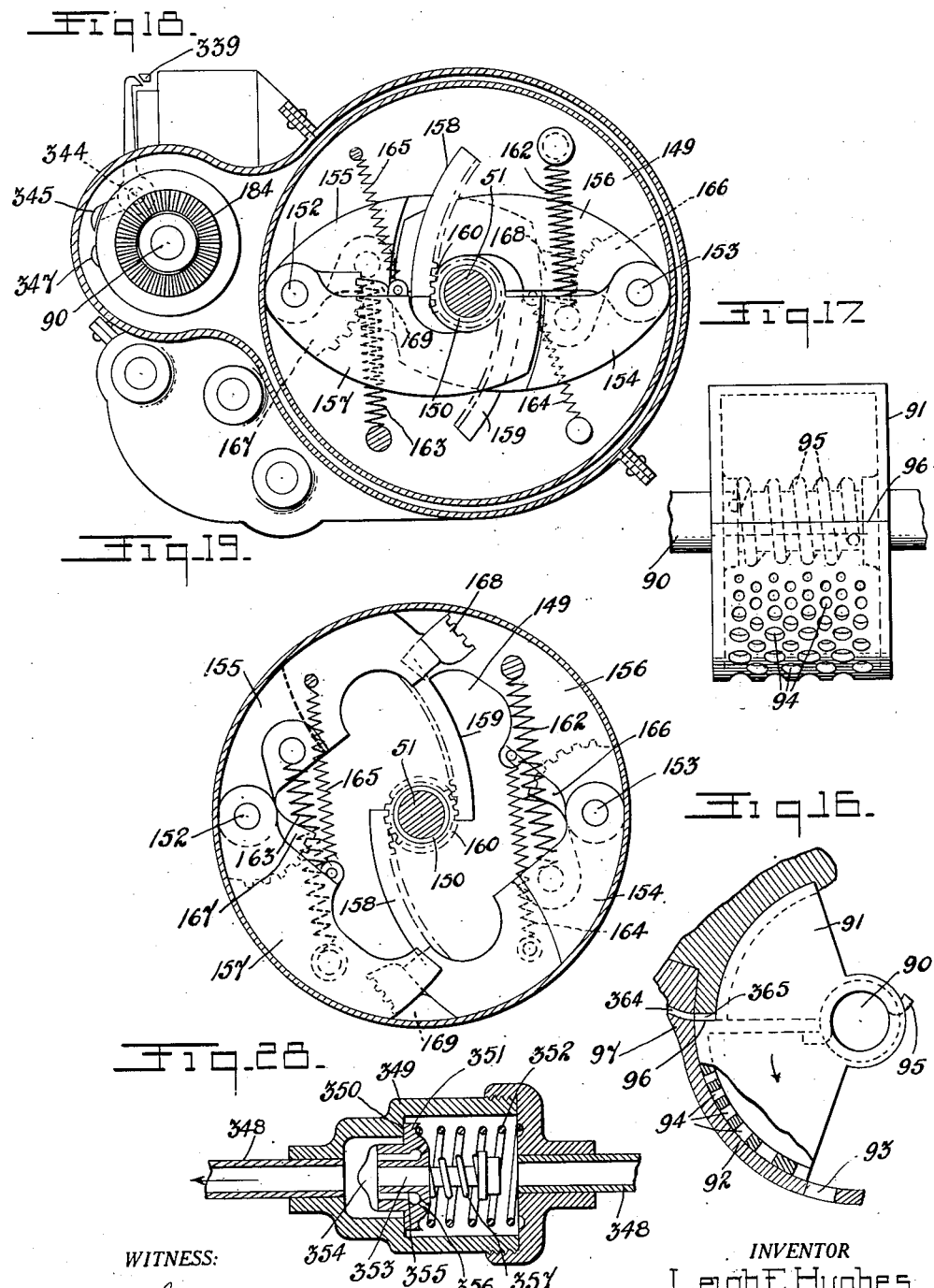
WITNESS:
INVENTOR
Leigh E. Hughes
BY
HIS ATTORNEY

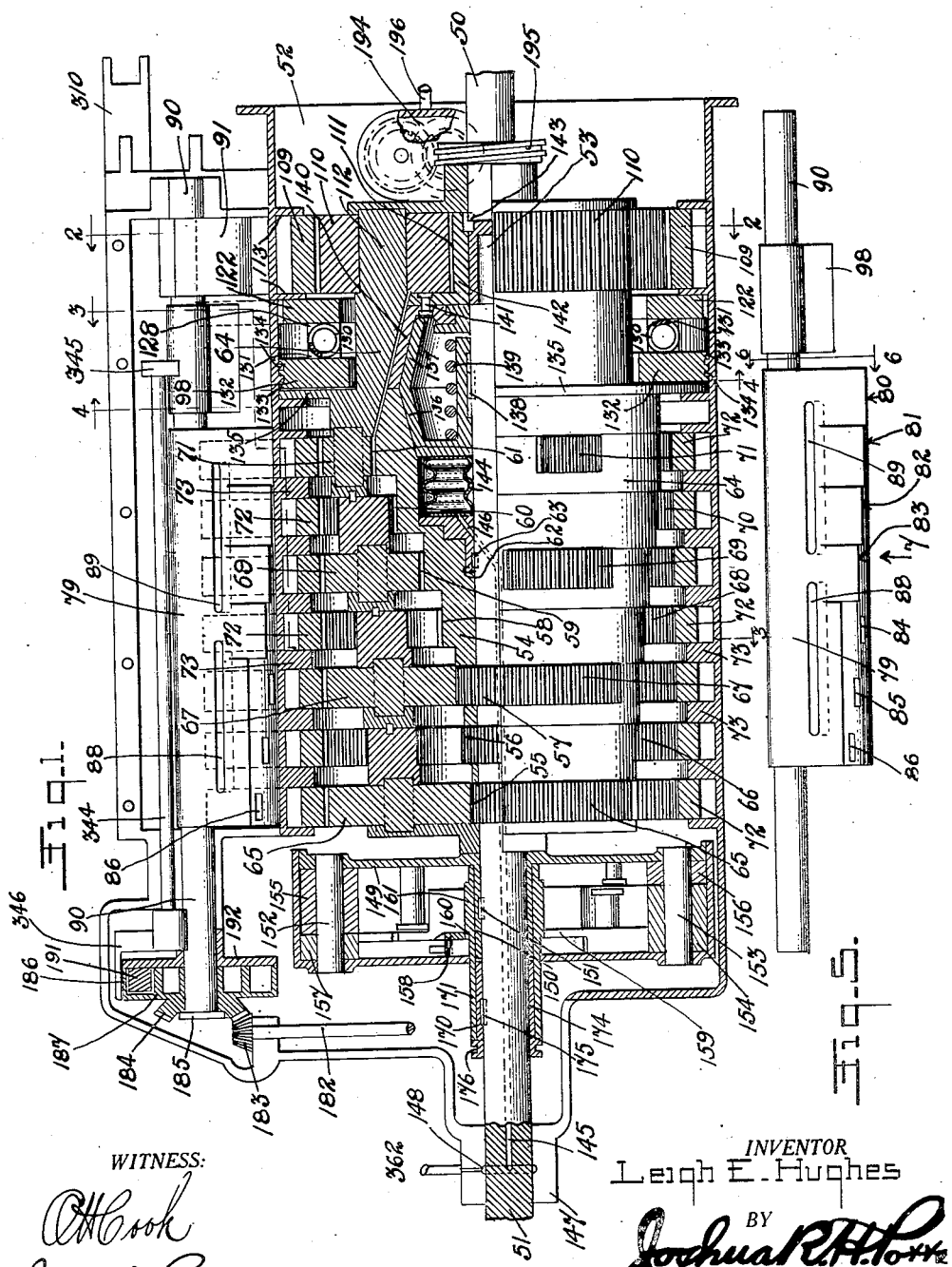

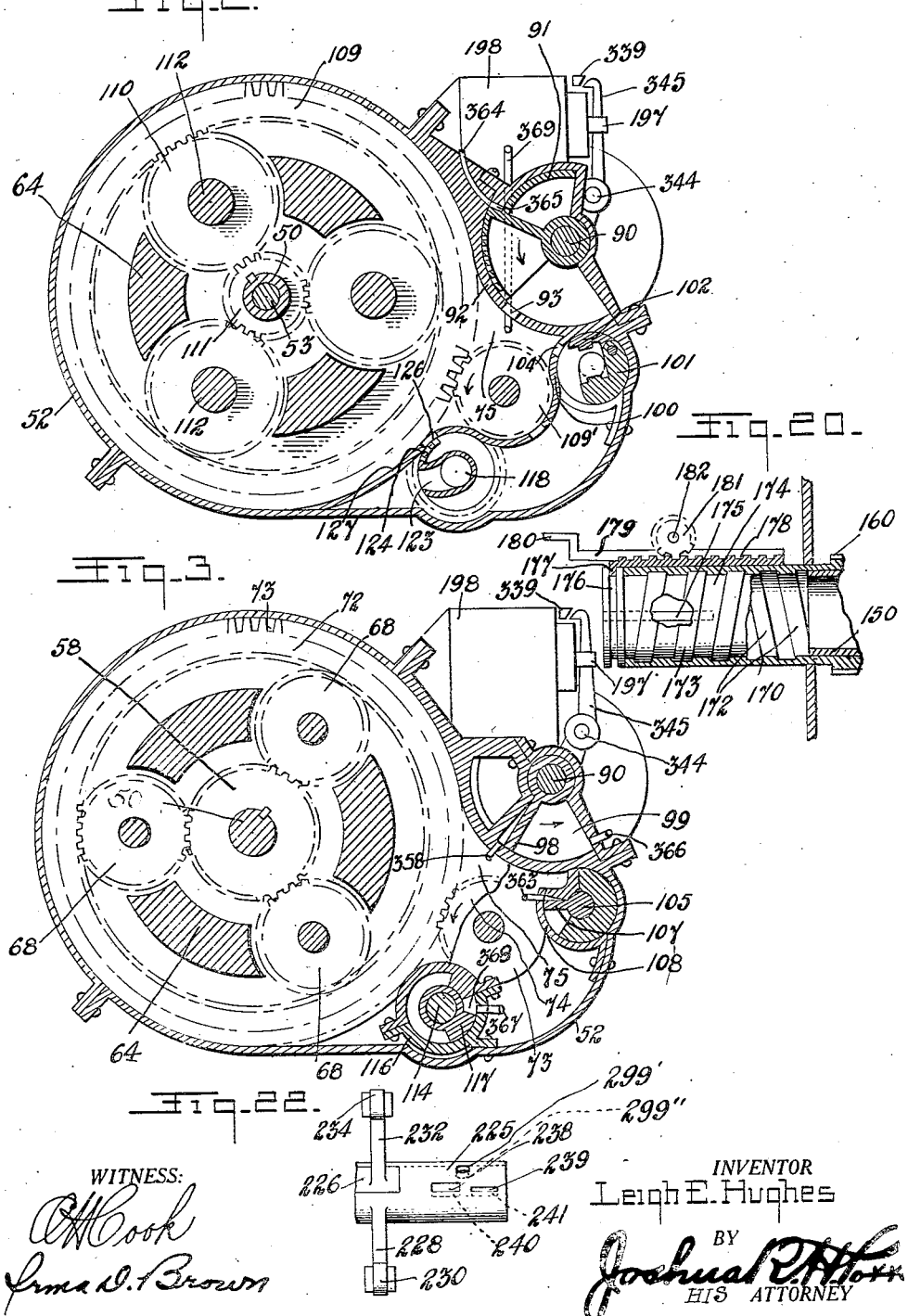

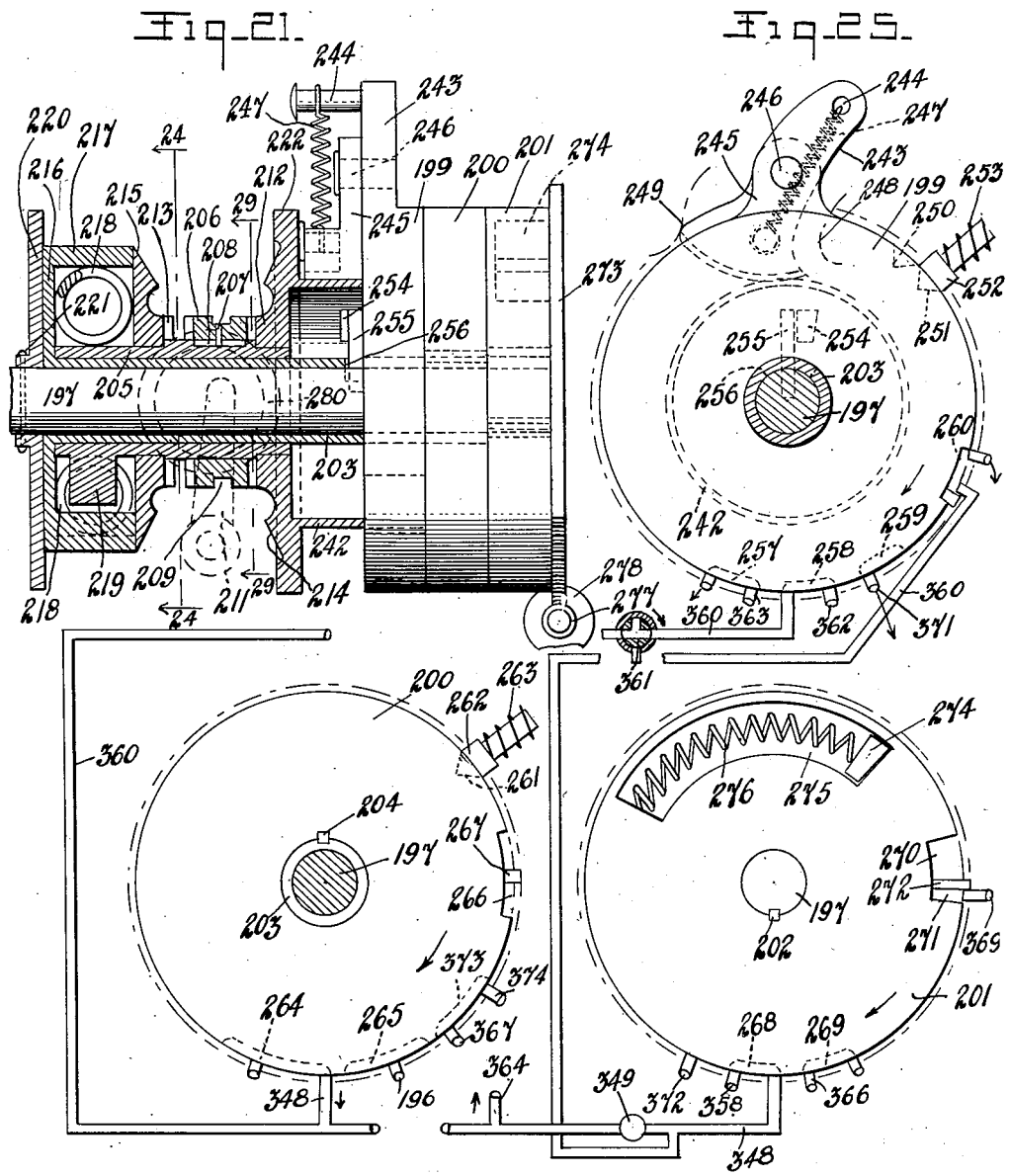

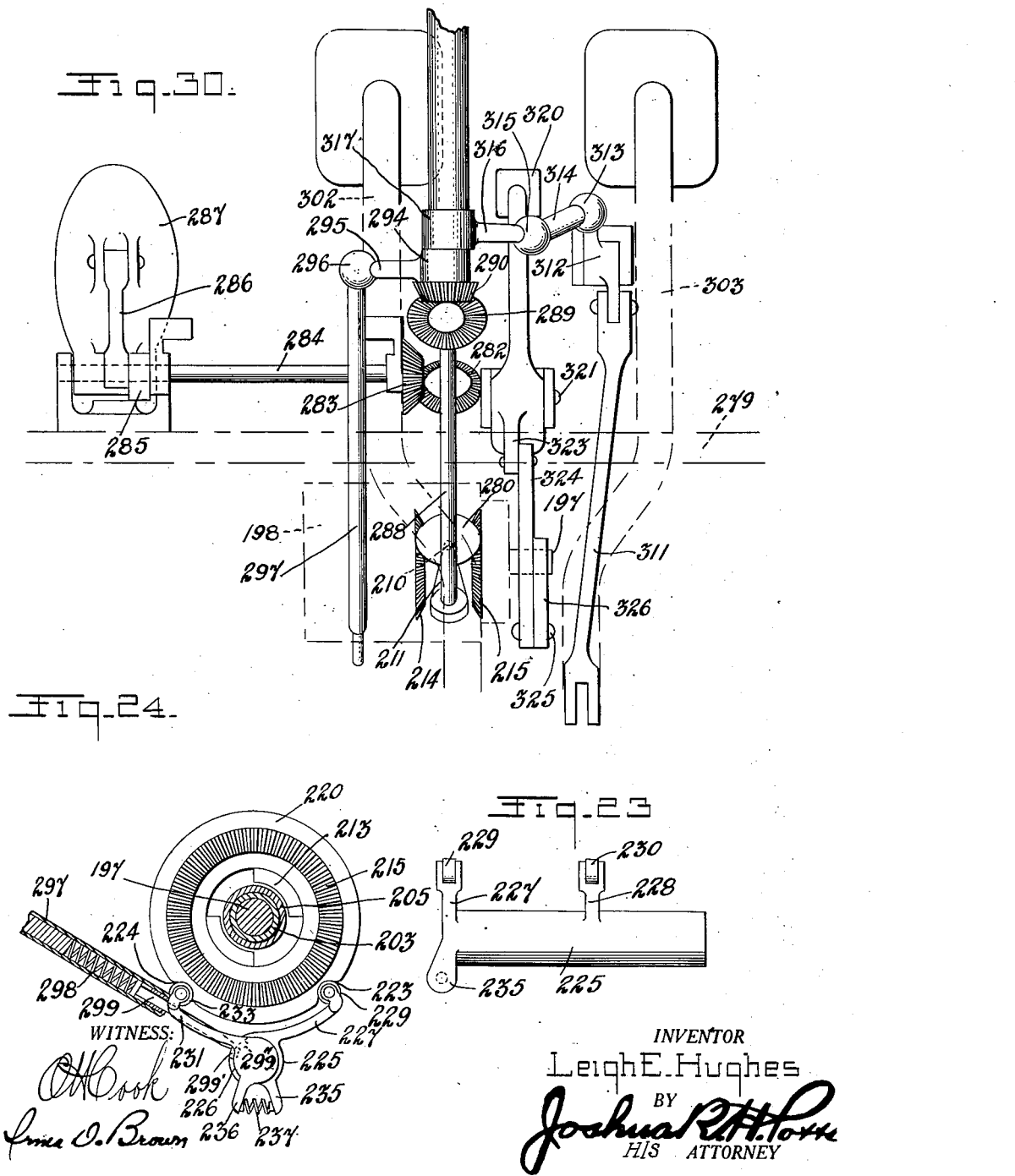

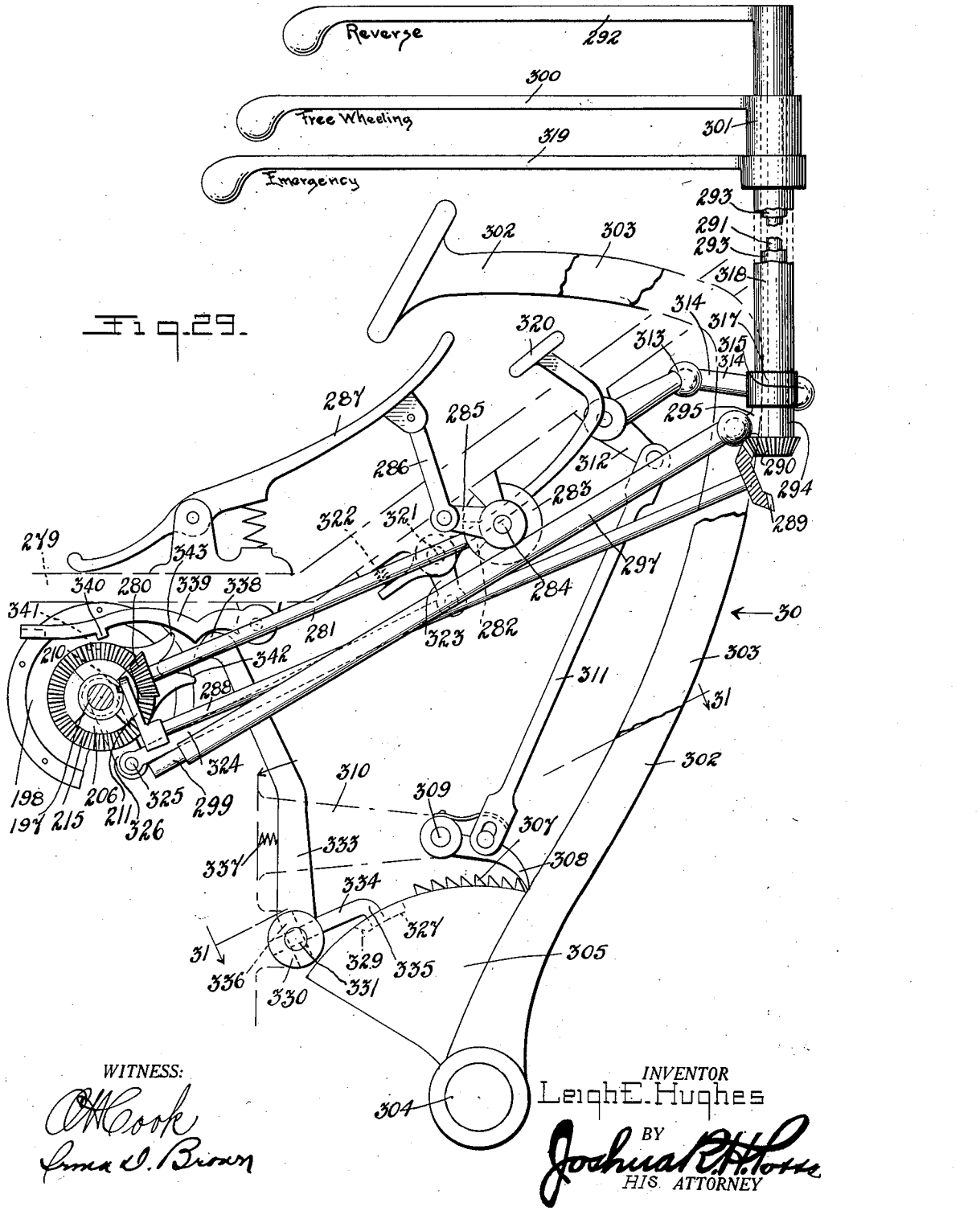

Patented Apr. 6, 1937

2,075,944

UNITED STATES PATENT OFFICE 2,075,944

HYDRAULIC TRANSMISSION

Leigh E. Hughes, Philadelphia, Pa.

Application May 5, 1932, Serial No. 609,404

46 Claims. (Cl. 74—259)

This invention relates to hydraulic transmissions, and has for an object to provide an improved type of mechanism for transmitting motion from a driving shaft to a driven shaft.

A further object of the invention is to provide a stepped gear connected with the driven shaft, and improved means for connecting idlers with said stepped gears in consonance with the speed and load.

A further object of the invention is to provide in a transmission a driving shaft and a driven shaft, with a stepped gear carried by the driven shaft, a cone rotating at times about the driven shaft and carrying a plurality of idlers in mesh with the gear of the stepped gear, with ring gears in mesh with the idlers, and improvided means for stopping one of said ring gears automatically and selected mechanically by the speed and load of the driven shaft.

A further object of the invention is to provide valve structures for controlling the stoppage of ring gears, the operation of which valves is initiated manually and continued mechanically as speed is taken up on the driven shaft.

A further object of the invention is to provide improved means which shall mechanically build up speed on the driven shaft after being manually initiated, and when the maximum relative speed has been attained, to couple the driven shaft directly to the driving shaft to rotate therewith.

A further object of the invention is to provide improved means for disconnecting the driven shaft from the driving mechanism to provide for independent rotation of the shafts.

A further object of the invention is to provide an improved type of centrifugal governor operating upon the driven shaft and controlling the coupling ratio of the driving and driven shafts.

A further object of the invention is to provide improved means for coupling the driving and driven shafts so that the driven shaft shall rotate in a direction opposite to the rotation of the driving shaft.

The invention therefore comprises a driving shaft which takes power from any prime mover, a driven shaft which connects with any power consuming mechanism, a stepped gear loosely mounted upon the driven shaft, a plurality of ring gears embracing the stepped gear, said ring gears having internal and external gear teeth and operating between separating partitions, with idlers of graduated sizes interposed between the internal gears of the rings, and the gears of the stepped gears with other idlers engaging the external teeth of the ring gears to form a pump which when interrupted will stop the rotation of a mechanically selected ring gear whereby the power from the driving shaft operating the idlers will be transmitted to the stepped gear to rotate the driven shaft, and with the necessary valves manually and mechanically operating to control the stopping of the ring gears for the purpose and in the manner described.

The drawings illustrate an embodiment of the invention and the views therein are as follows:

Figure 1 is a view partly in section and partly in elevation as the transmitting mechanism would be seen, the sections being horizontal planes and the main section being substantially a radial section through the structure, Figure 2 is a transverse sectional view, taken on line 2—2 of Figure 1, Figure 3 is a transverse sectional view, taken on line 3—3 of Figure 1, Figure 4 is a transverse sectional view, taken on line 4—4 of Figure 1, Figure 5 is a view in plan of the main valve in normal or low position, Figure 6 is a view of said main valve in end elevation, with a part broken away and the shaft shown in section as indicated by line 6—6 of Figure 5, Figure 7 is a schematic view of the main valve projected upon a plane, and showing in dotted lines the relative positions of the ports leading to the ring gears, Figure 8 is a view in elevation of a valve organization functioning principally as a relief valve, Figure 9 is a view of the last mentioned valve organization in end elevation as indicated by arrow 9 at Figure 8, Figure 10 is a transverse sectional view through the motor for actuating the valve shown at and taken on line 10—10 of Figure 8, Figure 11 is a view in elevation of another valve organization, Figure 12 is a view of the valve organization in end elevation as indicated by arrow 12 at Figure 11, Figure 13 is a view taken transversely upon Figure 11 as indicated by line 13—13 at said figure and showing the housing in which is mounted the valve actuating mechanism, Figure 14 is a view in end elevation with a part broken away of a part of the mechanism transmitting control motion from the governor to the main valve, Figure 15 is a view in transverse section of the structure shown at and taken on line 15—15 of Figure 14, arrow 14 showing the relative position of the structure as shown at Figure 14, Figure 16 is a view in end elevation with a part broken away of one of the valves, Figure 17 is a view in side elevation of the valve shown at Figure 16, Figure 18 is a view of the centrifugal governor with the cover of the housing removed, the governor parts being shown in inactive position, Figure 19 is a view of the centrifugal governor with the parts in their extreme expanded positions, Figure 20 is a detail view of a part of the governing mechanism showing the means of applying the control of the governor to the valve mechanism, Figure 21 is a view partly in elevation and partly in section of the manual control valve for initiating action of the several automatic mechanically controlled elements, Figure 22 is a fragmentary view in elevation of one of the controlling members, Figure 23 is a view of the same controlling member as shown at Figure 22, seen from a different point of elevation, Figure 24 is a view of the structure shown at Figures 22 and 23 seen in end elevation, together with a part controlled thereby, Figure 25 is a diagrammatic view showing the operation of the manual controlling structure, shown at Figures 21 to 24 inclusive, Figure 26 is a view in plan of the housing for containing the manual control mechanism shown at Figure 21, Figure 27 is a view of the housing in end elevation, Figure 28 is a diametrical sectional view shown through a relief valve, Figure 29 is a view in elevation of the manual and foot controlling organization, Figure 30 is a view of the same organization shown at Figure 29 and from the point of view indicated by arrow 30 at that figure, and Figure 31 is a sectional view through the manual and foot control mechanism, taken on line 31—31 of Figure 29, with parts omitted.

Like characters of reference indicate corresponding parts throughout the several views.

The improved hydraulic transmission mechanism, which forms the subject matter of this application, is adapted to be introduced between a prime mover or other source of power and power consuming organization.

As illustrated, the transmission is particularly organized for use upon an automotive vehicle to transmit power from the prime mover which, in this case, is illustrated by the driving shaft 50 and to transmit such power in varying speed ratios to the driven shaft 51 which is supposed to be connected with the running gear of the vehicle. It is the mechanism interposed between this driving shaft 50 and driven shaft 51 and the control of the same which forms the present invention.

At such place as may be found desirable, a housing 52 is erected. In the ordinary transmission of automotive vehicle structures, this housing would be located beneath the floor of the vehicle. Into this housing the driving shaft 50 extends, coupling therein with the driven shaft 51 in any approved manner. As shown at Figures 1 and 2, the driving shaft 50 is provided in its inserted end with a socket and the driven shaft 51 with a reduced part 53 which is inserted into said socket so that said shafts 50 and 51 will maintain constant alinement.

Upon the driven shaft 51 a stepped gear 54 is mounted having in its structure a plurality of pinions 55, 56, 57, 58, 59, 60 and 61. This stepped gear is loosely mounted upon the driven shaft 51 by any ordinary securing means, such as the collar 62. A key 63 also secures the collar 62 rigidly upon said driven shaft 51.

Surrounding the stepped gear is a cone which is indicated in its entirety at 64. This cone carries a plurality of idlers rotating in planetary fashion about the several gears of the stepped gear. The idlers in engagement with the gear 55 are numbered 65, the idlers 66 engaging the gears 56, the idlers 67, 68, 69, 70 and 71 engaging respectively the stepped gears 58, 59, 60 and 61.

Embracing and surrounding these several sets of idlers 65 to 71 inclusive, are similar ring gears 72. These ring gears are all substantially identical and rotate between partitions 73.

Mounted within the housing are a plurality of idlers 74 (see Figure 3) corresponding in numbers to and engaging the exterior gear teeth of the ring gears 72 so that as the ring gears rotate in the direction indicated by the arrow at Figure 3, co-action of the ring gears 72 and the idlers 74 operating between the partition walls 73 creates a gear pump which delivers the hydraulic liquid into the chamber 75 in said Figure 3, a wall of said chamber being formed by the wall 76 (see Figure 6). This wall 76 has two longitudinally extending rows of triangular ports 77 and 78 (see Figures 6 and 7). This wall 76, as will be noted from Figure 6, is arcuate and the main valve 79 is mounted in oil excluding relation to said arcuate wall. As will be noted from Figures 5, 6 and 7, this main valve 79 is stepped and is provided with a series of ports through the several steps. Such ports are here numbered 80, 81, 82, 83, 84, 85 and 86.

These several ports 80 to 86 inclusive in said valve communicate with a passage 87, and passages 88 and 89 are formed through said valve body as indicated more particularly at Figures 1 and 5. This main valve 79 is rigidly mounted upon a shaft 90, journaled at its opposite ends in the housing 52. Mounted also upon the shaft 90 is a valve member 91 which bears against an arcuate wall 92 heretofore described, but is separated therefrom. This arcuate wall 92 is provided with a port 93, over which the arcuate surface of the valve 91 may move. This arcuate surface is provided with a plurality of perforations 94 which are graduated in sizes as indicated at Figures 16 and 17. A spring 95, coiled about the shaft 90 which carries this valve 91, tends to maintain a fixed position relative to said shaft. The valve 91 is provided with a shoulder 96 which, together with the housing, forms a pocket 97 to receive hydraulic pressure in the manner to be hereinafter more fully described.

Rigidly mounted upon the shaft 90 also, is a vein 98 operating in an arcuate chamber 99 (see Figures 3 and 4). The actuation of this vein 98, which in its actuation oscillates the shaft 90 and controls the main valve 79, will be hereinafter more fully described.

Forming a rear wall of the chamber 75 is an arcuate partition 100 with a valve organization rotating in conjunction with this arcuate wall. This valve organization is shown at Figure 8, and comprises a body part 101 having a plurality of valve members 102 hinged thereto as shown at Figures 2 and 8.

Springs 103 tend to hold these valve members 102 in engagement with the arcuate wall 100 and at times to close the ports 104 through this arcuate wall. At Figure 2, the springs 103 have been omitted simply to avoid confusion. The same type of valve is shown with a double spring at Figure 8. These valve bodies 101 are integral with or rigidly connected to the shaft 105 which is journaled in the housing 52, and a spring 106 is employed to maintain the shaft and its associated parts in normal position, but to permit its being oscillated. The oscillation of the shaft is carried out by means of a fin 107 integral or rigidly connected with the shaft and oscillating in engagement with an arcuate wall 108. The means of actuating the shaft through the medium of the fin 107 will be hereinafter more fully described.

The valves 102 carried by the shaft 105 are equal in number to the ring gears 72 and each is placed opposite a port 104 which in turn is opposite one of said ring gears so that when the valves 102 are closed over the port 104, each of these valves becomes independently a safety valve to relieve the pressure within the chamber 75 which is built up by the co-action of the ring gear and its idler. When the organization as an entirety is moved to the position shown at Figure 2, all of these ports are open and all of the ring gears are therefore relieved.

The double valve controls a port which registers with the driving ring gear 109 which is similar to the ring gears 72 and rotates about idlers 110 (see Figures 1 and 2) and engages a gear 111 rigidly connected with the driving shaft 50. The idlers 110 are journaled upon trunnions 112 which are integral with or form a part of the unitary organization of the cone 64. This ring gear 109 operates between walls 113 the same as the walls 73, so that the driving ring gear 109 operates in all respects similar to the ring gears 72 and is relieved by the double valve 102 shown at Figure 8.

A reversing valve is also carried by the housing. The shaft 114 is journaled in the housing 52 and is provided with a spring 115 tending to hold the valve in normal position. The valve is surrounded by a housing 116, and the shaft carries a fin 117 therein, and means to be hereinafter more fully described is provided for exerting pressure upon said fin to operate the shaft. The shaft is hollow as indicated at 118 for a distance, and has ports 119 and 120 which are located opposite two of the ring gears 72. The shaft is also provided with a gear 121 which is in engagement with a gear 122 encircling the cone 64. The passage 118 through the shaft communicates with a port 123 and carries an arcuate valve member 124 which is provided with graduated perforations 125. These graduated perforations 125 cover a port 126 in the arcuate wall 127 so that the flow through these ports in the manner of reversing may be graduated to a nicety.

The ring gear 122 (see Figures 1 and 4) carries abutments 128 with spring guides 129 carried thereby, springs 130 being mounted upon said guides and bearing against abutments 131 integral with a ring 132. The ring 132 is provided with peripheral screw threads 133 engaging with screw threads 134 formed in the housing 52. The actuation of the ring gear 122 by the gear 121 operating through the springs 130, will rotate the gear ring 133 in engagement with the screw threads just described to clamp this ring 133 against the annular part 135 of the cone 64. This clamping of the cone by the ring 132 locks the cone rigidly in engagement with the housing so that the power transmitted from the driving shaft 50 is reversed in the manner to be hereinafter more fully described.

Mounted to slide upon the driven shaft 51 is a clutch member having oppositely inclined clutch parts 136 and 137. The clutch member is mounted to slide upon the driven shaft 51 and is held against rotation by the spline 138. A spring 139 tends to hold the clutch part 136 in locking engagement with the stepped gear by engaging the inclined inner surface thereof as indicated at Figure 1. At the opposite movement of the clutch, the part 137 engages the inclined part 140 which is rigidly secured to the driving shaft by any convenient means as the bolt 141 engaging the flanged hub 142 which is splined to the driving shaft as indicated at 143. To move the clutch member against the tension of the spring 139, a collapsible chamber member 144 is located to bear against the collar 63 at one end and against the clutch member at the opposite end.

A passage 145 is provided through the driven shaft 51 and by means of a branch passage 146 communicates directly with the collapsible chamber member 144. The hub 147 of the housing 52 which journals the shaft 51 is provided with an annular furrow 148 communicating with the passage 145. Pressure for operating this will be discussed in later description.

Mounted also upon the driven shaft 51 is a centrifugal governor shown in section at Figure 1 and in elevation at Figures 18 and 19. This comprises a housing 149 having a hub 150 splined to the shaft 51 as shown at 151 so that the housing rotates with this driven shaft 51. Within this housing, pintles 152 and 153 are erected and thereon are fulcrumed the heavy centrifugal weights 154 and 155 and the lighter centrifugal weights 156 and 157. These heavy centrifugal weights 154 and 155, as will be noted especially from Figures 18 and 19, respectively carry segmental gears 158 and 159 which engage a gear 160 carried upon a sleeve 161 (see Figure 1). The heavier centrifugal weights 154 and 155 are respectively controlled by springs 162 and 163, while the light centrifugal weights are similarly controlled by springs 164 and 165.

The light centrifugal weights 156 and 157 carry respectively segments 166 and 167, while the heavy centrifugal members carry the segments 168 and 169.

When, therefore, the several centrifugal governor members expand from the position of rest as shown at Figure 18 to or toward the completely expanded position at Figure 19, the segments 158 and 159 will rotate the gear 160 relative to the sleeve 170 which underlies the sleeve 171 integral or rigidly connected with the gear 160. At Figure 1, the scale is so small that the relation of these parts is not clearly demonstratable. At Figure 20, a detail is shown. As will be seen therein, the sleeve 170 is provided with internal spiral threads 172 engaging complementary spiral threads 173 on the sleeve 174, which operates within the sleeve 170. This sleeve 174 immediately embraces the shaft 51 and is splined thereto by the spline 175 so that it will rotate with the shaft, but may slide longitudinally when the sleeve 170 is rotated, by the gear 160. The sleeve 174 is provided with a furrow 176 which engages a tongue 177 of a rack 178 which is mounted to slide in a guide way 179 secured to the housing in any approved manner as by the offset 180. This rack 178 engages a gear 181 which is carried upon the shaft 182. This shaft 182 (returning to Figure 1) is shown as being journaled in the housing and carrying a bevelled pinion 183 engaging a bevelled gear 184. At Figures 14 and 15 the latter is shown on an enlarged scale. The gear 184 is held loosely upon the shaft 90 by means of a collar 185 splined to said shaft. The gear 184 carries annular walls 186 and 187 between which is located a spring 188.

The walls 186 and 187 have shoulders against which washers 189 and 190 are held by means of the spring 188 forming an interval between said washers within which is located an abutment 191 carried upon a disk 192 rigidly secured to the shaft 90 in any approved manner as by the set screw 193. It will be obvious, therefore, that the gear 184 may rotate in either direction relative to the shaft 90 by the compression of either side of the spring 188.

For the purpose of controlling the various instrumentalities, a gear pump 194 is mounted upon the housing in such position as to drain the oil or other hydraulic agent from the bottom of said housing. This gear pump 194 is of the usual and ordinary type and is driven from a worm 195 mounted upon the driving shaft 50. It is provided with a relief valve not shown, which is the usual and ordinary accompaniment of such gear pumps. A pipe 196 leads off from this gear pump. By reference to the diagrammatic Figure 25, it will be seen that this pipe 196 communicates with the manual control system. This manual control system comprises a shaft 197 journaled in the housing 198 shown at Figures 26 and 27. Within this housing 198 are mounted three disks 199, 200 and 201. Disk 201 is rigidly secured to the shaft as by the spline 202 and embracing the shaft is a sleeve 203 to which disk 200 is secured as by the spline 204. The disk 199 is mounted to oscillate upon the sleeve 203. Mounted also upon the sleeve 203 is a second sleeve 205 (see Figure 21).

Mounted upon the sleeve 205 is a clutch member 206 which has engagement with the sleeve 205 by means of a pin 207 in a slot 208. The clutch member 206 is provided with an annular furrow 209 engaged by a pin 210 carried upon an arm 211. The clutch member 206 may, as actuated by the arm 211, engage either of the clutch faces 212 or 213. These clutch faces 212 and 213 respectively carry gears 214 and 215

The sleeve 203 is preferably integral with an annular part 216 which by means of the flange 217, forms with the gear 215 an annular passage within which is located the spring 218. The sleeve 205 carries an abutment 219 operating within this annular chamber against the tension of the spring 218. Adjacent to the disk 216 is a disk 220 which is pinned or otherwise rigidly secured to the shaft 197, a pin 221 being shown for the purpose. The gear 214 carries a disk 222 similar in all respects to the disk 220. Each of these disks is provided with spaced recesses 223 and 224 as shown more particularly at Figure 24. Directly beneath the shaft 197 a sleeve 225 is mounted with an inner sleeve 226 rotatable therein. The sleeve 225 carries two arms 227 and 228 with rollers 229 and 230 thereon. The inner sleeve 226 similarly carries two arms 231 and 232 with similar rollers 233 and 234. These several rollers 229, 230, 233 and 234 engage in the recesses 223 and 224 of the disks 220 and 222. The sleeve 225 is provided with a finger 235 and the sleeve 226 with a finger 236 between which a spring 237 is positioned normally spreading said fingers and contracting the arms 227 and 231 to engage in the recesses.

The outer sleeve 225 is provided with ports 238 and 239, while the inner sleeve is provided with ports 240 and 241 which register when the arms 227 and 231 are separated by the contraction of the springs 237. The port 240 is a passage all the way through the inner sleeve 226 and the sleeve 225 has another port on the opposite side (not shown). The port 241 communicates with the passage from which it forms a by-pass.

The disk 222 carries a drum 242 rigidly mounted thereon or integral therewith, and abutting against the disk valve member 199. This disk valve member 199 carries an ear 243 with a pin 244 rigidly secured thereto. A detent 245 is pivoted to the ear 243 at 246 and a spring 247 spans the pivot 246 and is adapted to hold the detent at either limit of its movement upon this pivot.

The limit of the movement of the detent 245 are the abutments 248 and 249, which are shown in their proper location in the diagrammatic Figure 25 and in dotted lines at Figure 27. This disk valve 199 is also provided in its periphery with notches 250 and 251, and a detent 252 is controlled by a spring 253 to enter said notches at either of the movement limits of the disk. This disk 199 is also provided with a detent 245 against which abuts a pin 255 inserted through a slot 256 in the sleeve 203 and rigidly secured in the shaft 197.

The disk valve 199 has about its perimeter spaced passages 257, 258, 259 and 260, communicating with conduits inserted through the housing which will be hereinafter more fully described.

The disk 200 likewise has a notch 261 in its perimeter with a detent 262 controlled by a spring 263. This disk has about its perimeter also passages 264 and 265, and a limiting slot 266. A limiting abutment 267 is formed in the housing to engage the shoulders at the limit of movement of the slot 266.

The valve disk 201 has formed about its perimeter passages 268 and 269 with a limiting slot 270. The limiting slot 270 also provides a pocket 271 between one of the limits of said slot and the abutment 272 which is inserted from the housing into this slot. The housing is provided with a plurality of conduits which will be more fully described hereinafter.

At the end of the bank of disk valves, a disk 273 is provided having an abutment 274 extending into an arcuate slot 275 in the disk 201 and a spring 276 located in said arcuate slot, bearing at one end against the limit of the slot and at the opposite end against the abutment 274. This abutment may be adjusted along the arcuature of the slot 275 by the rotation of the disk 273 which is accomplished by means of the worm 277 and knurled head 278.

At Figures 29, 30 and 31 are shown manual and foot controls for the several elements hereinbefore described. In those figures, 279 will be assumed to be the floor upon or under which the mechanism is located. The housing 198 journaling the shaft 197, is mounted immediately beneath said floor 279. The gear 215 upon said shaft is shown in said figure with a pinion 280 engaging said gear, and as will be seen from Figures 21 and 30, said pinion 280 engages both of the gears 214 and 215.

As has been noted, these gears are free to rotate a limited distance, and such rotation is imparted thereto by a shaft 281 which carries a gear 282 engaged with a pinion 283 carried upon the shaft 284. The shaft 284 has an arm 285 extending therefrom, which is engaged by a link 286 from the accelerator pedal 287. No connection to this pedal for the purpose of accelerating engine speed is shown. Such connection will be as usual, the link 286 and other parts being additional to the usual equipment. It is obvious that when the pedal is depressed, the shaft 281 and the gear 282 will be rotated to rotate both of the gears 214 and 215. Either of these gears may be connected with the shaft 197 by means of the clutch which is moved by the arm 211 as above described.

To move this arm 211, a rod or shaft 288 is provided with a pinion 289 engaging another pinion 290 which is carried rigidly upon a shaft 291 controlled by the lever 292. This lever 292 is to be mounted upon the dash or instrument board or other place convenient to access. The shaft 291 is surrounded by a sleeve 293 which connects with a collar 294. The collar 294 carries an arm 295, and by a ball and socket joint 296, connects with the rod 297. This rod 297 (see Figure 24) is hollow at its lower end and contains a spring 298 controlling a finger 299 at the end, which said finger 299 is positioned to at proper times enter openings 299' and 299" of the sleeves 225 and 226 (see Figures 22 and 24), and hold the ports 238 and 240 in register to provide the passage through the cooperating sleeve valve. The sleeve 293 is provided with a lever 300 which is secured thereto as at 301 and is adjacent to the lever 292.

In this installation, brake pedal levers 302 and 303 are fulcrumed in the usual manner at 304. There are two of these brake pedals similar in general respects, and they respectively carry segments 305 and 306. The latter segment is provided along one side with a plurality of rack teeth 307 which are engaged by a detent 308 shown at Figure 29 but omitted from Figure 31. This detent 308 is fulcrumed at 309 to any convenient part of the mechanism as the bracket 310 shown in dotted lines at Figure 29 and in full lines at Figure 1. The detent 308 is operated by a link 311 which is pivoted to a bell crank lever 312. The bell crank lever 312 is provided with a ball and socket joint 313, one part of which is the link 314 extending to another ball and socket joint 315 carried by the arm 316 connected to the collar 317, carried upon the sleeve 318. The sleeve 318 is provided with a lever 319 similar to the levers 292 and 300. It will be observed, that only one of the brake levers is provided with the segmental rack, and this brake lever will displace the usual "emergency brake" found upon motor vehicles, releasing the hand of the operator from any brake control.

Mounted also adjacent to these parts is an auxiliary pedal 320 fulcrumed at 321 with a spring 322 for maintaining it yieldingly in normal position. To this pedal is attached an arm 323 pivoted to a link 324. This link 324 is pivoted at 325 to a lever 326 rigidly connected with the shaft 197.

The brake segments 306 are provided with recesses 327 and 328 having inclined lower or rearward margins as indicated at 329. Adjacent to the perimeter of these segments, a block 330 is journaled by means of trunnions 331 and ears 332. This block carries rigidly and preferably integral therewith an arm 333. There is also pivotally connected with the block an arm 334 having a finger 335 turned downwardly within the recesses 327 and 328. This arm 334 is pivoted at 336 so that it may swing laterally. When either of the brake levers 302 or 303 are moved independently, the inclined shoulder 329 will merely swing the arm 334 entirely into the recess of the segment not moving and, therefore, have no effect upon the arm. When, however, both of the segments are moved simultaneously, the finger 335 engages in the lower part of the inclined shoulder 329 and is lifted upon the fulcrum consisting of the trunnions 331. This lifting moves the lever 333 in the direction indicated by the arrow and against the tension of the spring 337. The upper end of this lever 333 has a cam formation at 338 operating under the lever 339. This lever 339 has a pawl 340 which engages in a notch 341 formed in the sleeve 217. The head 338 of the lever 333 performs another function in that when it moves in the direction indicated, it enters between the prongs 342 and 343 also carried upon the ring 217.

This lever 339 is also operated in another manner. A shaft 344 is journaled parallel to the shaft 90 and carries a lever 345 which engages under a cam extremity of the lever 339 as shown more particularly at Figures 2, 3 and 4.

This shaft 344 is provided with a crank arm 346 extending over the annular wall 186 of the gear member 184 (see Figures 14 and 15). Upon this annular wall, a shoulder 347 is erected which engages the lever 345 when the gear 184 is rotated by the governor (see Figure 18).

As shown at diagrammatic Figure 25, the disk valve 200 is in neutral position. When the valve is rotated in the direction indicated by the arrow, the recess 265 which covers the end of the conduit 196 from the pump 194 will span the pipe 348. It is to be understood, of course, that any type of liquid may be employed to operate the hydraulic transmission. As at present understood, however, some grade of oil is considered the best medium. The oil not only transmits the power, but also lubricates. The oil from the pump, therefore, through the pipe 196 will enter the recess 265 and the pipe 348. In this pipe 348 is introduced a relief valve shown as an entirety as 349 and in detail at Figure 28. This relief valve comprises a housing having a valve seat 350 upon which is seated a valve 351 held to position by a spring 352. Through this valve 351 a valve stem 353 passes with a valve 354 carried by said valve stem and closing an annular orifice 355, which communicates with the interior of the housing by passages 356. A spring 357 holds this valve also to seat. Liquid passing in the direction indicated by the arrow at Figure 28 will unseat the valve 354 and pass through and along the pipe 348.

The spring 352 is a relatively light tensioned spring which offers but relatively small resistance to the passage. Having passed this valve 349, the liquid enters the disk valve 201, passes through the recess 268 and emerges from the pipe 358 where it passes to the pocket 359 at the rear of the vein 98 on the shaft 90. When the vein 98 has been moved to the limit of its movement, the back pressure will build up in the pipe 360 and passing the valve 361, will enter the recess 258 of the disk 199, and emerge from the pipe 362 which is in communication with the passage 148 formed in the bearing 147 and with the passage 145 through the shaft 51 (see Figure 1). The oil passing through this passage 145 is delivered to the expandible chamber 144 and acts upon the sliding clutch member. With the valve 199 rotated in the direction indicated by the arrow until the detent 252 engages in the notch 250, the oil pressure built up in the pipe 360 passes through the recess 258 and emerges from the pipe 363. This pipe 363 communicates with the pocket at the rear of the fin 107 (see Figures 3 and 4). Pressure also builds up in the pipe 364 which communicates with the pocket 365, controlling the valve 91 (see Figures 2 and 16).

With the disk 201 located a step in the direction indicated by the arrow, the recess 269 will span the pipe 348 and the pipe 366 which communicates with the chamber at one side of the fin 98 (see Figures 3 and 4).

For reversing, the disk 200 is moved in the direction opposite to that shown by the arrow, whereupon, pressure from the pump through the pipe 196 will be delivered to the pipe 367 which communicates with the pocket 368 at one side of the fin 117 (see Figure 3). A pipe 369 is also provided communicating with the chamber 75 (see Figure 2) and extending to the pocket 271 controlling the disk 201.

In operation, the driving shaft 50, being driven from the motor, will drive the gear pump 194 and oil will pass through the pipe 196 to the disk valve 200. The disk valve as shown in diagrammatic figure 25, is in neutral and no action will result, and the pressure in the gear pump will be relieved by the relief valve forming a part of the organization of that pump, not shown. In this position, also, the clutch part 136, under the action of the spring 139, couples the driven shaft and the stepped gear 54. Depressing the accelerator pedal 287 will rotate the pinion 282 which is connected through the shaft 281 with the gear 280 which is in engagement with both gears 214 and 215. The clutch member 206 is normally in engagement with the gear 214 so that the rotation of the pinion 280 will be transmitted through the gear 214 to the drum 242. The engagement of the detent 245 with this drum in the relation shown at Figure 25, will move the disk 199 until the detent 252 engages in the notch 250. At this position, the detent 245 has engaged the abutment 248 which has snapped the detent out of engagement with the drum 242, and by reason of the spring 247 passing the pivot 246 will hold that detent in such position that the disk 199 is subject to further movement.

The movement of the clutch with the gear 214 will also rotate the sleeve 205 and the abutment 219 which, acting against the spring 218, will rotate the disk 216 and sleeve 203. The sleeve 203 being fixed to the disk 200, will rotate that disk in the direction indicated by the arrow. This will move the disk so that the recess 265 spans the pipe 196 through which oil pressure is being delivered and deliver that pressure to the pipe 348.

By reason of the valve 349, pressure will build up in the pipe 364 which communicates with the pocket 365 (see Figure 2) and to move the valve 91 in the direction indicated by the arrow. Referring now to Figure 16, it will be seen that this movement of the valve 91 in the direction indicated by the arrow will move that valve over the port 93. The rotation of the driving shaft 50 has been communicated through the gear 111 to the idlers 110. These idlers 110 rotating with the gear 111 and normally held against movement by the trunnions 112, will tend to rotate the driving ring gear 109. This driving ring gear 109 will, therefore, move in the direction indicated by the arrow at Figure 2, and by engagement with the idler 109', will deliver oil from the housing to the pocket 75. So long as the port 93 is open, the oil so delivered will pass freely through this port and run back into the housing. As the valve 91 closes, however, the perforations 94 will gradually close this port until complete closure has been attained, whereupon, the ring 109 will be arrested in its movement and held stationary.

The power of the gear 111 on the driving shaft will then be transmitted through the idlers to rotate the cone 64, the trunnions 112 being integral with such cone. The rotation of the cone 64 will carry with it all of the several idlers 65, 66, 67, 68, 69, 70 and 71. These idlers also all in engagement with the stepped gear 54, will travel about said stepped gear, and being also in engagement with all of the ring gears 72, will move said ring gears at different speed ratios because of the different gear ratios of engagement. The pressure which is delivered through the pipe 364 to the pocket 365 (see Figure 2), will build up in that pocket and overflow through the pipe 364. The movement of the sleeve 203 to move the valve 200 has also resulted in the movement of the valve 199.

Pressure now will pass through the valve 349 to the recess 268 emerging from the pipe 358 which communicates at the back of the fin 98 (see Figure 3), moving that fin in that direction, and rotating the shaft 90. The rotation of the shaft 90 will move the main valve 79. In initial position, the relation of the ports of the valve 79 and the ports 77 and 78 (see Figures 6 and 7) are such that the port opening from the ring gear 72 controlled by the idler 70 is closed, consequently, the oil carried by this ring gear when subjected to the idlers and by reason of the closure of the port 81, will stop this ring gear so that it can no longer rotate.

The stoppage of this ring gear and the rotation of the cone 64 transmits the speed resulting from such rotation and stoppage of the ring gear to the gear 60 of the stepped gear. At the same time, all of the several idlers 69, 68, 67, 66 and 65 are progressively travelling at a greater speed, but the ring gears are able to move because the ports corresponding to such ring gears are open. The ring gear carried by the idler 69 is, therefore, pumping oil through the port 82 into the passage 87 and outwardly through the port 80 to the ring gear carried by the idler 71. As the gear ratio of these several gears is properly maintained, the idler 70 will have the assistance of the idlers 69 and 71 in the rotation of the stepped gear. As, however, the pressure builds up back of the fin 98, this main valve will be oscillated to successively cover the ports 82, 83, 84 and 85, and at the same time throwing the ports open upon opposite sides of said covered port in communication with the passage 87 so that whichever ring gear is stopped by the closing of its ports, it will have the assistance of the gearing upon each side. In other words, the ring gear carried by the idlers 70 is the low gear and the ring gear carried by the idlers 66 is the high gear, the idlers 65 and 71 adding at the opposite ends of the scale their assistance respectively to the high and low gears mentioned.

The building up of the pressure back of the fin 98 will, therefore, gradually build up the speed at which the stepped gear is rotated.

When the main valve has been moved by the fin 98 to the complete high position, the building up of the pressure in said fin will cause the oil under pressure to pass through the pipe 360 and the recess 258, emerging from the pipe 362 which, as also seen from Figure 1, communicates with the bore 145 through the shaft 51 and with the expansible chamber 144. The expansion of the chamber 144 will move the clutch member against the tension of the spring 138 to release the clutch face 136 and engage the clutch face 137 directly with the cone 140, which is carried directly upon the driving shaft 50 so that at this point the driven shaft is connected directly with the driving shaft.

At such times as it is desirable to reduce the speed ratio of the driven shaft 51 to less than the driving shaft 50, it is necessary again to bring into action the main valve 79 and it is, therefore, desirable to have this valve always so positioned that the ring gear, whose port is closed, will be the exact speed ratio maintained by the driven shaft 51. This is accomplished through the centrifugal governor. As the centrifugal governor units expand to rotate the gear 160, it is communicated through the sleeve 170 to move the sleeve 174 and thereby move the rack 178 and rotate the gear 181 and shaft 182 (see Figure 20). The shaft 182, carrying the pinion 183 (see Figure 1) will engage the gear 184 (see Figures 14 and 15). This will cause the gear 184 and the housing 187 carried thereby to put under tension the spring 188.

When, therefore, the main valve 97 has been released from operation, the position of this valve is maintained by the governor in accordance with the speed of rotation of the driven shaft 51.

When it is desired to stop, the accelerator pedal being released, the disk valves 199 and 200 will be moved backwardly until the recess 268 in the disk valve 201 will form communication from the pipe 348 to the pipe 366. The release of the accelerator pedal will, of course, slow down the engine in the usual manner and the governor will, as hereinbefore described, actuate the main valve 79 until the lower speed ratio has been reached.

At this point, the gear 184 which carries the shoulder 347 will have reached such a point that said shoulder will engage the lever 346 (see Figure 1) and oscillate the shaft 344. The oscillation of this shaft 344 (see Figures 2, 3 and 18) will propel the lever 345 against the lever 339 (see Figure 29) lifting said lever so that the finger 340 thereon will be disengaged from the recess 341 upon the flange 217. The spring 218, acting against the abutment 219, will thereupon throw the several disk valves 199, 200 and 201 to normal position and the brakes applied in the usual manner will bring the vehicle to a rest. This, of course, is a normal stop. The action of the several parts as noted, will be accelerated by the application of the brake which will slow down the driven shaft 51 and therefore, the action of the governor and the train of action above outlined.

In case of an emergency stop, both brake pedals 302 and 303 are depressed either simultaneously or in sequence. This depression of both of these brake pedals will lift the arm 334 and actuate the lever 333 against the tension of the spring 337. The movement of this lever 333 through the medium of the cam head 338 raises the lever 339 to release the parts as above outlined. For emergency, however, the normal action of the parts is accelerated by the cam head 338 engaging between the horns 342 and 343. These horns are mounted upon disk 200 and therefore instantly operate this disk valve which is the main control valve.

As will be noted, the pipe 366 acts upon the opposite side of the fin 98, and the pressure will, therefore, turn the main valve 79 backwardly until the gear ratio has been lowered to correspond with the load. Preceding this, the rotation of the disk valve 199 in the direction opposite that indicated by the arrow, will put the pipe 362 in communication with the outlet 371. This will permit the oil contained in the expansible chamber 144 to drain out, whereupon, the spring 139 will release the clutch from engagement with the driving shaft and connect the stepped gear only with the driven shaft. At the same time, the pipe 358 which has furnished pressure upon the side of the fin to move the main valve to higher position will drain the oil through the recess 268 and out through the pipe 372 back into the casing.

For reversing, the reversing lever 292 is oscillated to oscillate through the shaft 288 the lever 211, which will throw the clutch member 206 to the position opposite that shown at Figure 21. Now depressing the accelerator pedal 287, will reverse the motion of the disks 199 and 200 so that the recess 265 (see Figure 25) will move to cover the pipe 367. Thus the oil pressure from the pump passing through the pipe 196 will emerge to pipe 367. By reference to Figure 3, it will be seen that pipe 367 communicates with pocket 368 at the rear of fin 117 upon shaft 114. Referring now to Figures 2 and 11, it will be seen that this rotation will gradually move the perforated valve 124 to close the port 126 and to move still further until the passage 123 is in communication with said port 126. The rotation of the shaft 114 rotates the gear 121 which is in mesh with the gear 122. This gear 122 will thereby be moved, moving the abutment 128 against the tension of the spring 130, acting against the abutment 131, will rotate the disk 132. This disk 132, as will be noted especially from Figure 1 has a threaded connection with the housing 52 and the rotary movement will clamp this disk 132 rigidly against the flange 135 of the cone 64. The cone 64 will therefore be locked against movement and the idlers 110 carried thereby will be held by fixed journals. The rotation of the gear 111 fixed to the driving shaft 50 will therefore rotate the ring gear 109 and will force oil through the passage 126 (see Figure 2) by reason of the engagement of the idler 109' with the ring gear 109.

The oil under pressure entering such passage will pass through the bore 118 of the shaft 114 (see Figure 11) and will emerge from the ports 119 and 120. These ports 119 and 120 are located opposite the ring gears 72 carried by the idlers 70 and 71. It will therefore drive the ring gears in the reversed direction, and by reason of the fact that the cone is held stationary, the idlers 70 and 71 will transmit power to the stepped gear 54 which will rotate the stepped gear in the direction opposite the original rotation, and therefore, reverse the movement of the vehicle or other driven device. When the disk 200 has been again rotated, in the direction indicated by the arrow, the pressure upon the fin 117 will be relieved by the oil passing backwardly through the pipe 367 to enter the passage 373 in the disk valve 200, and draining through the port 374 back into the housing.

For "free wheeling", the lever 300 is actuated to operate through the collar 294 the rod 297 and finger 299, to withdraw said finger from engagement with the openings 299' and 299'' (see Figures 22 and 29). This provides for the actuation of the valve which is shown in Figure 25 as 361. The showing at 361 is merely a conventional three-way valve and is shown to clarify understanding of the operation of the valve structure as shown at Figure 22.

In accordance with the diagrammatic showing, the withdrawal of the finger 299 will have the effect of rotating valve 361 a quarter turn in the direction indicated by the arrow, whereupon, the pipe 360 will drain back to the housing.

It will be understood, of course, that at this time, the disk valve 199 is a step in the direction indicated by the arrow in advance of that shown in the drawings, so that the pipe 360 will then communicate with the outlet 363 which controls the shaft 105 (see Figure 8). The relief of pressure back of the fin 107 (see Figure 3) will permit the spring 106 to rotate the shaft 105 to move all of the valves 102 to open the various ports which control the chambers 75, permitting all of the ring gears 92 and 109 to float freely, but valve 91 controlling the clutch does not move.

The disk valve 201 moves only when the engine is overloaded causing extreme pressure in the chamber 75 (see Figure 2). This pressure is relieved through pipe 369 which communicates with pocket 271 of said valve 201 moving said valve in the direction of the arrow and against the pressure of spring 276 which is controlled by the abutment 274 adjustable as has been explained through the medium of the disk 273 and the worm 277. The movement of this valve 201 as noted, will cause oil to flow from the pipe 348 through the recess 269 into the pipe 366 (see Figure 3) moving the fin 98 in the direction opposite the arrow, or toward "low".

The same result is manually attained by depressing the foot pedal 329 (see Figures 29 and 30) which, operating through the lever 323 and link 324, moves the lever 326 which likewise moves the disk valve 201 as described with the same result.

At all other times, the disk valve 201 is held by the spring 276 in the position shown at Figure 25, that is to say at "high".

Of course, the hydraulic transmission, herein illustrated may be modified and changed in various ways without departing from the invention herein set forth and hereinafter claimed.

The invention is hereby claimed as follows:

1. A hydraulic transmission comprising a driving shaft and an alined driven shaft, a stepped gear mounted upon the driven shaft, a clutch adapted at times to connect the driven shaft and stepped gear rigidly together, planetary gearing surrounding the stepped gear, hydraulic means for stopping elected planetary units, manual means for initiating the hydraulic action, and mechanical means progressively stopping other of said planetary units.

2. A hydraulic transmission comprising a driving shaft and an alined driven shaft, a stepped gear mounted upon the driven shaft, a clutch adapted at times to connect the stepped gear and driven shaft, a plurality of planetary gear systems embracing the stepped gear, a wall coacting with the planetary gear systems and provided with ports, a valve adapted to progressively close said ports to stop units of the planetary gear systems progressively, manual means to initiate action of said valve, and mechanical means for continuing the movement of said valve.

3. A hydraulic transmission comprising a driving shaft and an alined driven shaft, a stepped gear mounted upon the driven shaft, a clutch adapted at times to connect the stepped gear to the driven shaft, a plurality of planetary gear systems embracing the stepped gear, a wall co-acting with the planetary gear systems and provided with ports, a valve mounted to progressively close said ports to stop the planetary gear parts successively, and means at the termination of said valve movement to move said clutch from connection with the driven shaft to connection with the driving shaft.

4. A hydraulic transmission comprising a driving shaft and an alined driven shaft, a stepped gear mounted upon the driven shaft, a clutch splined to move longitudinally upon the driven shaft and to at times make connections with the stepped gear, a plurality of planetary gear systems embracing the stepped gear, means to actuate the entire planetary systems, hydraulic means tending to interrupt movement of a unit of one of said planetary systems and transmit the moving stress to the stepped gear, means to progressively change the hydraulic control to interrupt units of others of said planetary systems progressively, and means at the limit of said progressive action to move the clutch upon the driven shaft into driving engagement with the driving shaft.

5. A hydraulic transmission comprising a driving shaft and a driven shaft, a stepped gear mounted upon the driven shaft, a plurality of planetary gear systems surrounding the stepped gear having upon the exterior internally and externally toothed gear rings, idlers mounted in engagement with each of said gear rings, a wall provided with ports corresponding to each of said gear rings adapted to educt liquid interrupted by the conjoint action of the ring gears and idlers, a valve arranged to progressively close said ports to interrupt the rotation of the ring gears, and hydraulic means to move said valve to progressively close said ports.

6. A hydraulic transmission comprising a driving shaft and a driven shaft, a stepped gear mounted upon the driven shaft, a plurality of planetary gear systems surrounding the stepped gear having upon the exterior internally and externally toothed gear rings, idlers mounted in engagement with each of said gear rings, a wall provided with ports corresponding to each of said gear rings adapted to educt liquid interrupted by the conjoint action of the ring gears and idlers, a valve arranged to progressively close said ports to interrupt the rotation of the ring gears, hydraulic means to move said valve to progressively close said ports, and manually controlled means for initiating the said hydraulic means.

7. A hydraulic transmission comprising a driving shaft and a driven shaft, a stepped gear mounted upon the driven shaft, a plurality of planetary systems embracing said stepped gear, said planetary systems each embodying a ring gear and idlers interlying the ring gear and the stepped gear, other idlers engaging the exterior of said ring gears and co-acting therewith as a gear pump, a wall provided with ports positioned to educt liquid motivated by said pump action, a valve having ports positioned to communicate with some of said first mentioned ports and to close others of first mentioned ports, hydraulic means for moving the valve to close progressively the ports of the ring gears in series, and manual means to control said last mentioned hydraulic action.

8. A hydraulic transmission comprising a driving shaft and a driven shaft, a stepped gear on the driven shaft, a plurality of planetary gear systems embracing said stepped gear, each of said systems including a ring gear and idlers interlying the ring gear and the stepped gear, other idlers co-acting with the exterior of the ring gear as gear pumps, a wall having ports positioned to educt liquid resultant from said gear pump action, a valve adapted to progressively close some of said ports to interrupt the movement of the ring gear and transmit power to the stepped gear, a centrifugal governor carried by the driven shaft, and means connecting said centrifugal governor with said valve to move said valve in consonance with the rotation of the driven shaft.

9. A hydraulic transmission comprising a driving shaft and a driven shaft, a stepped gear mounted upon the driven shaft, a cone embracing said driven shaft and journaling idlers intermeshing with the several gears of the stepped gear, ring gears embracing the idlers, other idlers co-acting with the exterior of said ring gears as gear pumps, means to drive the cone and the idlers in planetary action about the stepped gear, a wall provided with ports positioned to educt liquid moved by the said gear pump action, a valve positioned to close some of said ports, a centrifugal governor carried by the driven shaft, means connecting the centrifugal governor with said valve to move said valve to close ports in consonance with the rotation of the driven shaft, and means to at times disconnect the stepped gear from the driven shaft and connect the driven shaft directly to the driving shaft.

10. A hydraulic transmission comprising a driving shaft and a driven shaft, a stepped gear mounted upon the driven shaft, a clutch slidably mounted upon the driven shaft and normally making connection between said shaft and stepped gear, a cone embracing the stepped gear and journaling a plurality of idlers intermeshing with the gear of the stepped gear, a plurality of ring gears embracing the idlers, means to drive the cone from the driving shaft, other idlers cooperating with the exterior of the ring gears as gear pumps, a wall provided with ports positioned to educt the resultant liquid of said gear pump action, a valve positioned to close some of said ports, hydraulic means to move said valve to progressively close said ports, a centrifugal governor carried by the driven shaft, means connecting the governor to move the valve in consonance with the rotation of the driven shaft, means at the limit of progressive movement of the valve to move the clutch from engagement with the stepped gear into engagement with the driving shaft, means to relieve all of the ring gears, and manual means to control the hydraulic actuation of the valve.

11. A hydraulic transmission comprising a driving shaft and a driven shaft, a stepped gear mounted upon the driven shaft, a clutch splined to move upon the driven shaft, means to hold the clutch normally in engagement with the stepped gear, a cone embracing the stepped gear, a plurality of idlers journaled in said cone and intermeshed with the gears of the stepped gears, ring gears embracing the idlers and intermeshed therewith, other idlers cooperating with the exterior of the ring gears and functioning therewith as gear pumps, a wall provided with ports positioned to educt liquid through said gear pump action, a valve positioned to progressively close said ports to interrupt the eduction of liquid, means operative at the end of said progressive valve action to shift the clutch from engagement with the stepped gear into engagement with the driving shaft, another valve organization closing other of said ports, and hydraulic means to actuate said last mentioned valve organization to open all of the ports closed thereby.

12. A hydraulic transmission comprising a driving shaft, a gear mounted upon the driving shaft, a plurality of idlers engaging said gear, a cone having trunnions inherent therein journaling said idlers, a ring gear embracing said idlers, another idler engaging the exterior of said ring gear and cooperating therewith as a gear pump, a wall provided with a port positioned to educt liquid from said gear pump action, a valve adapted to close said port, manual means for actuating said valve to close said port and rotate said cone, a driven shaft mounted axially within the cone, a stepped gear carried by the driven shaft and located within the cone, a plurality of idlers carried by the cone and intermeshed with the gears of the stepped gear, ring gears embracing said last idlers, other idlers engaging the exterior of said last mentioned ring gears and cooperating therewith as gear pumps, a wall provided with ports positioned to educt liquid from the action of said gear pumps, a valve adapted to move to interrupt the action of said gear pumps progressively to stop said ring gears, hydraulic means for moving said valves, and manual means for controlling said last mentioned hydraulic means.

13. The combination with a prime mover having a throttle, a load, a geared transmission from the prime mover to the load, automatic means to vary the gear ratio of transmission, and means initiated from the throttle to initiate said automatic means, the while maintaining the transmission in connection with both the prime mover and the load.

14. A hydraulic transmission comprising a driving shaft and a driven shaft, a stepped gear carried by the driven shaft, a plurality of planetary gear systems embracing and cooperating with said stepped gear, means to progressively interrupt the movement of said planetary systems to transmit power to the stepped gear, hydraulic means to move said progressive interrupting mechanism, and a supplemental control for said interrupting mechanism controlled from the driven shaft.

15. A hydraulic transmission comprising a driving shaft and a driven shaft, a stepped gear carried by the driven shaft, a plurality of planetary gear systems embracing and cooperating with said stepped gear, means to interrupt the action of said planetary systems progressively, hydraulic means for moving said interrupting means, a centrifugal governor carried by the driven shaft, and means connecting said centrifugal governor with said interrupting means to maintain said interrupting means constantly in a position consonant with the speed of rotation of the driven shaft.

16. A hydraulic transmission comprising a driving shaft and a driven shaft, a clutch splined upon the driven shaft, a stepped gear mounted upon the driven shaft, means to normally hold the clutch in engagement with the stepped gear, a plurality of planetary gear systems embracing said stepped gear, means to progressively interrupt the action of said planetary systems to transmit power to said stepped gear, and means operable at the termination of said progressive action to shift the clutch from engagement with the stepped gear into engagement with the driving shaft.

17. The combination of a driving part and a driven part, a geared and variable system continuously interconnecting the parts and tending to automatically increase the speed of the driven part to synchronization with the driving part, a clutch connecting the driving part and the variable interconnecting parts, and means for automatically releasing the clutch from the variable part of the interconnection and connecting said clutch directly from the driving to the driven parts, when the speed of the driven part synchronizes with the speed of the driving part.

18. The combination of a driving part and a driven part, a geared and variable system interconnecting the parts including stepped gear trains and a supplementary connecting system, a governor, and means controlled by the governor selecting the gear train from the stepped series of gears nearest the corresponding speed, and also the ratio from the infinitely variable supplementary system in consonance with the speed of the driven part.

19. The combination with a prime mover having a throttle, a variable transmission, a driven part, a governor, automatic means tending to synchronize the prime mover and the driven part, means controlled by the governor independently of the transmission, selecting the ratio of transmission in consonance with the speed of the driven part, means tending to hold the prime mover and driven part in synchronism until a new ratio connection is initiated from the throttle, and means initiated from the throttle to engage the transmission at any ratio selected by said governor.

20. The combination of a driving part and a driven part, a variable transmission interconnecting the parts, a governor, automatic means for varying the ratio of transmission independently of the governor, means controlled by the governor selecting the ratio of interconnection, and manual means for engaging the transmission at any ratio selected by the governor.

21. The combination with a prime mover having a throttle, a driven part, a variable transmission interconnecting the parts, automatic means varying the ratio of transmission and tending to synchronize the parts, and means initiated from the throttle initiating said automatic means.

22. The combination with a prime prime mover, a variable transmission, a part driven by the transmission, a ratio selecting mechanism for the transmission, automatic means controlling the ratio selecting mechanism, a speed governor, and means by which the speed governor takes control from said automatic means, an automatic clutch, and positive driving means for engaging said automatic clutch.

23. The combination with a prime mover, a variable transmission, a part driven by the transmission, a ratio selecting mechanism for the transmission, automatic means controlling the ratio selecting mechanism, a speed governor, a torque governor, means by which the speed governor takes the control of the ratio selecting mechanism from said automatic means, and means by which the torque governor exerts at all times a master control over said ratio selecting mechanism.

24. The combination with a prime mover having a throttle, a variable transmission, a part driven from the transmission, a speed governor, a ratio selecting mechanism acting progressively upon the transmission and normally under the control of the speed governor, and means by which said throttle takes the control of said selecting mechanism from the speed governor and engages the transmission independently of progression or sequence.

25. The combination with a prime mover having a throttle, a variable transmission, a part driven from the transmission, a speed governor, a torque governor, a ratio selecting mechanism for the transmission primarily under the control of the speed governor, means by which the throttle takes the control of said selecting mechanism from the speed governor, and means by which the torque governor takes the control of the selecting mechanism from the then functioning speed governor or throttle.

26. The combination with a prime mover having a throttle, a variable transmission, a part driven from the transmission, a speed governor, a torque governor, a ratio selecting mechanism for the transmission primarily under the control of the speed governor, means by which the throttle takes the control of said selecting mechanism from the speed governor, manual means for taking the control of the selecting mechanism from either the speed governor or the throttle, and means by which the torque governor takes the control of said selecting mechanism from any one of the said means then functioning.

27. The combination of a driving part and a driven part, a geared and variable system interconnecting the parts, automatic means tending to synchronize the driving part and driven part, a clutch connecting the driving part and the variable interconnecting parts, and means for automatically releasing the clutch from the variable part of the interconnection and connecting said clutch directly from the driving to the driven part when the speed of the driven part approximates the speed of the driving part.

28. The combination of a driving part and a driven part, a variable transmission interconnecting the parts, a governor, means controlled by the governor selecting different ratios of interconnection, means for maintaining constant driving connection between the driving and driven parts while the ratio of said interconnection is varied, and automatic means to disconnect the driving and driven parts when the speed of the driven part is reduced below a predetermined rate.

29. The combination with a prime mover having a throttle, a variable transmission, a part driven from the transmission, a speed governor, a progressive ratio selecting mechanism for the transmission normally under the control of the speed governor, means by which said throttle takes the control of said ratio selecting mechanism from the speed governor, and means for engaging the transmission independently of ratio progression or sequence.

30. The combination of a driving part and a driven part, a variable transmission interconnecting the parts, a speed governor, a torque governor, means controlled by said speed governor selecting the ratio of interconnection in consonance with the speed of the driven part, manual means for engaging the transmission at any ratio selected by said speed governor, and means controlled by said torque governor independently of speed governor or manual means adjusting the transmission ratio to the load.

31. The combination of a driving part and a driven part, a variable transmission interconnecting the parts, a governor, means controlled by the governor selecting the ratio of interconnection, automatic means to disconnect the driving and driven parts when the speed of the driven part is reduced below a predetermined rate, and manual means to prevent said automatic means from acting.

32. The combination of a driving part and a variably loaded part, a variable transmission interconnecting the driving part and loaded part, a torque governor, automatic means tending to synchronize the parts, means controlled by said torque governor varying the ratio of transmission in consonance with the load, and automatic means to disconnect the driving part and loaded part when the speed of the loaded part is reduced below a predetermined rate.

33. The combination with a prime mover having a throttle, a variable transmission, a driven part, a governor, progressively actuating means controlled by the governor independently of the transmission selecting the ratio of transmission in consonance with the speed of the driven part, and means initiated from the throttle to engage the transmission independently of the ratio progression or sequence at any ratio selected by said governor.

34. The combination with a prime mover having a throttle, a driven part, a plurality of organizations adapted to interconnect the prime mover and driven part, means to employ at all times a variable plurality of said organizations to vary the ratio of said interconnection, automatic means controlling said variable plurality of organizations, and means initiated from the throttle initiating said automatic means.

35. The combination with a prime mover, a variable transmission, a part driven by the transmission, a ratio selecting mechanism for the transmission, automatic means controlling the ratio selecting mechanism, a speed governor, a torque governor, means by which the speed governor takes the control of the ratio selecting mechanism from said automatic means, and means by which the torque governor can exert at all times a master control over said ratio selecting mechanism.

36. The combination with a prime mover having a throttle, a variable transmission, a part driven from the transmission, a speed governor, a torque governor, a ratio selecting mechanism for the transmission normally under the control of the speed governor, means by which the throttle takes the control of said selecting mechanism from the speed governor, and means by which the torque governor takes the control of the selecting mechanism from the then functioning speed governor or throttle.

37. The combination with a prime mover having a throttle, a variable transmission, a part driven from the transmission, a speed governor, a torque governor, a ratio selecting mechanism for the transmission normally under the control of the speed governor, means by which the throttle takes the control of said selecting mechanism from the speed governor, manual means for taking the control of the selecting mechanism from either the speed governor or the throttle, and means by which the torque governor takes the control of said selecting mechanism from any one of the said means then functioning.

38. The combination of a driving part and a driven part, a variable transmission interconnecting the parts, automatic means tending to synchronize the driving part and driven part, a governor, means controlled by the governor varying the ratio of interconnection, and automatic means to disconnect the driving part and driven part when the speed of the driven part is reduced below a predetermined rate.

39. The combination of a driving part and a driven part, a variable transmission interconnecting the parts, means for maintaining constant driving connection between driving and driven parts while the ratio of said interconnection is varied, automatic means tending to synchronize the driving and driven parts, a governor, and means controlled by the governor varying the ratio of interconnection.

40. The combination of a driving part and a driven part, a variable transmission interconnecting the parts, an automatic clutch, and a constant torque means operating said automatic clutch, said constant torque means embodying a positive drive for the said clutch.

41. The combination of a driving part and a driven part, a variable transmission interconnecting the parts, a governor, means controlled by the governor selecting the ratio of interconnection, an automatic clutch, and a positive driving means moving said automatic clutch.

42. The combination with a prime mover having a throttle, a variable transmission, a part driven from the transmission, a governor, means controlled by the governor varying the ratio of interconnection, an automatic clutch, a constant rate driving means operating said automatic clutch, and means initiated from the throttle initiating said constant rate driving means.

43. The combination of a driving part and a driven part, a variable transmission interconnecting the parts, a speed governor, a torque governor that is actuated solely by the load on the driving part, a constant ratio connection between the driving part and said governor that transmits the load variations to the governor, means controlled by said speed governor selecting the ratio of interconnection in consonance with the speed of the driven part, and means controlled by said torque governor overpowering the selection of said speed governor and adjusting the ratio to the load, said last mentioned means being operable at any speed to overpower the selection of the speed governor.

44. The combination of a driving part and a driven part, a geared and variable transmission including parts interconnecting the driving and driven parts, supplementary means for directly varying the interconnection, and means by which said supplementary means carries the load while the gear ratio is varied.

45. The combination with a prime mover, of a driven part and a variable transmission between the prime mover and driven part, said transmission including mechanism providing variation of the mechanical ratio between the prime mover and driven part, selecting mechanism, automatic means controlling the operation of the selecting mechanism, a speed governor, mechanism associated with the governor by which the governor takes control from the selecting mechanism, and manual means for engaging the transmission at any ratio selected by the governor.

46. The combination of a driving part and a driven part, with a variable transmission interconnecting the parts, a governor operatively associated with the transmission, said transmission including automatic means for synchronizing the operation thereof to the speed of the driving and driven parts independently of the action of the governor, and means controlled by the governor for varying the mechanical ratio of the transmission.

LEIGH E. HUGHES.